US010333911B2

(12) United States Patent
Elmoalem et al.

(10) Patent No.: US 10,333,911 B2
(45) Date of Patent: *Jun. 25, 2019

(54) FLASHLESS OPTICAL NETWORK UNIT

(71) Applicant: Avago Technologies International Sales Pte. Limited, Singapore (SG)

(72) Inventors: Eli Elmoalem, Central (IL); David Avishai, Nes Ziona (IL); Asaf Koren, Netanya (IL)

(73) Assignee: Avago Technologies International Sales Pte. Limited, Singapore (SG)

( * ) Notice: Subject to any disclaimer, the term of this patent is extended or adjusted under 35 U.S.C. 154(b) by 0 days.

This patent is subject to a terminal disclaimer.

(21) Appl. No.: 15/277,212

(22) Filed: Sep. 27, 2016

(65) Prior Publication Data
US 2017/0017484 A1 Jan. 19, 2017

Related U.S. Application Data

(63) Continuation of application No. 13/853,547, filed on Mar. 29, 2013, now Pat. No. 9,535,680.

(60) Provisional application No. 61/777,457, filed on Mar. 12, 2013.

(51) Int. Cl.
*H04B 10/27* (2013.01)
*H04B 17/00* (2015.01)
*H04J 14/00* (2006.01)
*G06F 9/44* (2018.01)
*H04L 29/06* (2006.01)
*G06F 8/65* (2018.01)
*H04B 10/272* (2013.01)
*H04L 9/14* (2006.01)
*H04L 9/30* (2006.01)
*H04Q 11/00* (2006.01)
*G06F 8/654* (2018.01)

(52) U.S. Cl.
CPC ............... *H04L 63/06* (2013.01); *G06F 8/65* (2013.01); *G06F 8/654* (2018.02); *H04B 10/272* (2013.01); *H04L 9/14* (2013.01); *H04L 9/30* (2013.01); *H04Q 11/0067* (2013.01); *H04Q 2011/0047* (2013.01); *H04Q 2011/0079* (2013.01); *H04Q 2011/0086* (2013.01)

(58) Field of Classification Search
CPC .. H04B 10/27; H04B 10/0795; H04B 10/272; H04L 12/40013; H04L 12/40026; H04L 12/4035
USPC .......................................... 398/43, 66, 58, 67
See application file for complete search history.

(56) References Cited

U.S. PATENT DOCUMENTS

| 5,978,374 | A | 11/1999 | Ghaibeh et al. |
| 8,555,273 | B1 * | 10/2013 | Chia ....................... G06F 8/665 717/168 |
| 8,839,230 | B2 | 9/2014 | Tsongas et al. |
| 9,535,680 | B2 * | 1/2017 | Elmoalem ................. G06F 8/65 |
| 2003/0048801 | A1 | 3/2003 | Sala et al. |

(Continued)

*Primary Examiner* — Oommen Jacob
(74) *Attorney, Agent, or Firm* — Sterne, Kessler, Goldstein & Fox P.L.L.C.

(57) ABSTRACT

A system, method, and computer program product for booting a device are provided herein. The method includes the steps of synchronizing the device based on a downstream signal from a second device, receiving a software from the second device for booting on a reserved downstream channel of the second device, and storing the received first software in a volatile memory. The device does not pre-store the software in a non-volatile memory.

17 Claims, 9 Drawing Sheets

(56) References Cited

U.S. PATENT DOCUMENTS

| | | |
|---|---|---|
| 2004/0133923 A1 | 7/2004 | Watson et al. |
| 2005/0083924 A1* | 4/2005 | Dillinger ............ G06F 11/1433 370/389 |
| 2005/0202808 A1 | 9/2005 | Fishman et al. |
| 2006/0007915 A1* | 1/2006 | Frame ................ H04M 7/0069 370/352 |
| 2006/0198408 A1 | 9/2006 | Park et al. |
| 2007/0036277 A1 | 2/2007 | Atkinson et al. |
| 2007/0064732 A1 | 3/2007 | Liaw et al. |
| 2007/0116466 A1 | 5/2007 | Gewirtzman et al. |
| 2007/0263782 A1 | 11/2007 | Stock et al. |
| 2007/0274341 A1 | 11/2007 | Rodriguez |
| 2008/0037563 A1 | 2/2008 | Bernard |
| 2008/0201748 A1 | 8/2008 | Hasek et al. |
| 2009/0041460 A1 | 2/2009 | Bernard et al. |
| 2009/0129773 A1 | 5/2009 | Oron |
| 2010/0015951 A1* | 1/2010 | Hahn ..................... H04W 8/16 455/411 |
| 2010/0040371 A1 | 2/2010 | Wu et al. |
| 2010/0095288 A1* | 4/2010 | Kim ................... H04N 21/4341 717/168 |
| 2010/0239252 A1* | 9/2010 | Davis .................. H04L 12/2885 398/58 |
| 2011/0029773 A1 | 2/2011 | Effenberger |
| 2011/0051656 A1* | 3/2011 | Hethuin ............... H04B 7/1555 370/315 |
| 2011/0052206 A1* | 3/2011 | Zheng .................. H04J 3/0697 398/154 |
| 2011/0099545 A1 | 4/2011 | Lee et al. |
| 2011/0167487 A1 | 7/2011 | Wu |
| 2011/0314492 A1 | 12/2011 | Cassidy et al. |
| 2012/0076494 A1 | 3/2012 | Nors |
| 2012/0096450 A1* | 4/2012 | Schaefer ............... G06F 21/572 717/168 |
| 2012/0182897 A1* | 7/2012 | Han ...................... H04W 48/20 370/252 |
| 2012/0218987 A1* | 8/2012 | Zhao ................. H04W 56/0005 370/350 |
| 2012/0315040 A1 | 12/2012 | Dahlfort et al. |
| 2014/0059531 A1 | 2/2014 | Lee et al. |
| 2014/0178072 A1 | 6/2014 | Yoo et al. |
| 2014/0255030 A1 | 9/2014 | Wu et al. |

* cited by examiner

FLASHLESS OPTICAL NETWORK UNIT

CROSS-REFERENCE TO RELATED APPLICATIONS

This application is the continuation of U.S. patent application Ser. No. 13/853,547, filed Mar. 29, 2013, which claims the benefit of U.S. Provisional Application No. 61/777,457, filed Mar. 12, 2013, both of which are incorporated herein by reference in their entirety.

BACKGROUND OF THE INVENTION

Field of the Invention

The embodiments presented herein generally relate to passive optical networks (PONs) and more specifically to flashless optical network units.

Background Art

In order to keep pace with increasing Internet traffic, network operators have widely deployed optical fibers and optical transmission equipment, substantially increasing the capacity of backbone networks. A corresponding increase in network access capacity is also needed to meet the increasing bandwidth demand of end users for triple play services, including Internet protocol (IP) video, high-speed data, and packet voice. Even with broadband solutions, such as digital subscriber line (DSL) and cable modem (CM), the limited bandwidth offered by current access networks still presents a severe bottleneck in delivering large bandwidth to end users. Among different competing technologies, passive optical networks (PONs) are one of the best candidates for next-generation access networks. With the large bandwidth of optical fibers, PONs can accommodate broadband voice, data, and video traffic simultaneously. Furthermore, PONs can be built with existing protocols, such as Ethernet and Asynchronous Transfer Mode (ATM), which facilitate interoperability between PONs and other network equipment.

Where the demand from users for bandwidth is rapidly increasing, optical transmission systems, where subscriber traffic is transmitted using optical networks, are being installed to serve this demand. These networks are typically referred to as fiber-to the-curb (FTTC), fiber-to-the building (FTTB), fiber-to-the premises (FTTP), or fiber-to-the-home (FTTH). Each such network provides access from a central office (CO) to a building, or a home, via optical fibers installed near or up to the subscribers' locations. As the transmission bandwidth of such an optical cable is much greater than the bandwidth actually required by each subscriber, a Passive Optical Network (PON), shared between a plurality of subscribers through a splitter, was developed.

Typically, PONs are used in the "first mile" of the network, which provides connectivity between the service provider's central offices and the premises of the customers. The "first mile" is generally a logical point-to-multipoint network, where a central office serves a number of customers. For example, a PON can adopt a tree topology, wherein one trunk fiber couples the central office to a passive optical splitter/combiner. Through a number of branch fibers, the passive optical splitter/combiner divides and distributes downstream optical signals to customers and combines upstream optical signals from customers. Other topologies are also possible, including ring and mesh topologies. Transmissions within a PON are typically performed between an optical line terminal (OLT) and optical network units (ONUs). The OLT controls channel connection, management, and maintenance, and generally resides in the central office. The OLT provides an interface between the PON and a metro backbone, which can be an external network belonging to, for example, an Internet service provider (ISP) or a local exchange carrier. The ONU terminates the PON and presents the native service interfaces to the end users, and can reside in the customer premises and the ONU couples to the customer's network through customer-premises equipment (CPE). As used herein, the term "downstream" refers to the transfer of information in a direction from an OLT to an ONU. The term "upstream" refers to the transfer of information in a direction from the ONUs to an OLT.

In typical PONs, an ONU stores software for its operation in a large non-volatile memory. The large non-volatile memory is not cost, power, or area effective in the design of ONUs, especially compact ONUs. Furthermore, software upgrade in conventional systems occur when an ONU downloads software from the OLT or when the OLT upgrades the software for each ONU on a point-to-point basis. This current method to upgrade software is slow and consumes significant OLT resources.

BRIEF DESCRIPTION OF THE DRAWINGS/FIGURES

The accompanying drawings, which are included to provide a further understanding of the invention and are incorporated in and constitute a part of this specification, illustrate embodiments of the invention, and together with the description, serve to explain the principles of the invention. In the drawings.

The present invention will now be described with reference to the accompanying drawings. In the drawings, like reference numbers may indicate identical or functionally similar elements.

DETAILED DESCRIPTION OF THE INVENTION

While the present disclosure is described herein with reference to illustrative embodiments for particular applications, it should be understood that the disclosure is not limited thereto. Those skilled in the relevant art(s) with access to the teachings provided herein will recognize additional modifications, applications, and embodiments within the scope thereof and additional fields in which the disclosure would be of significant utility.

Figure 1:
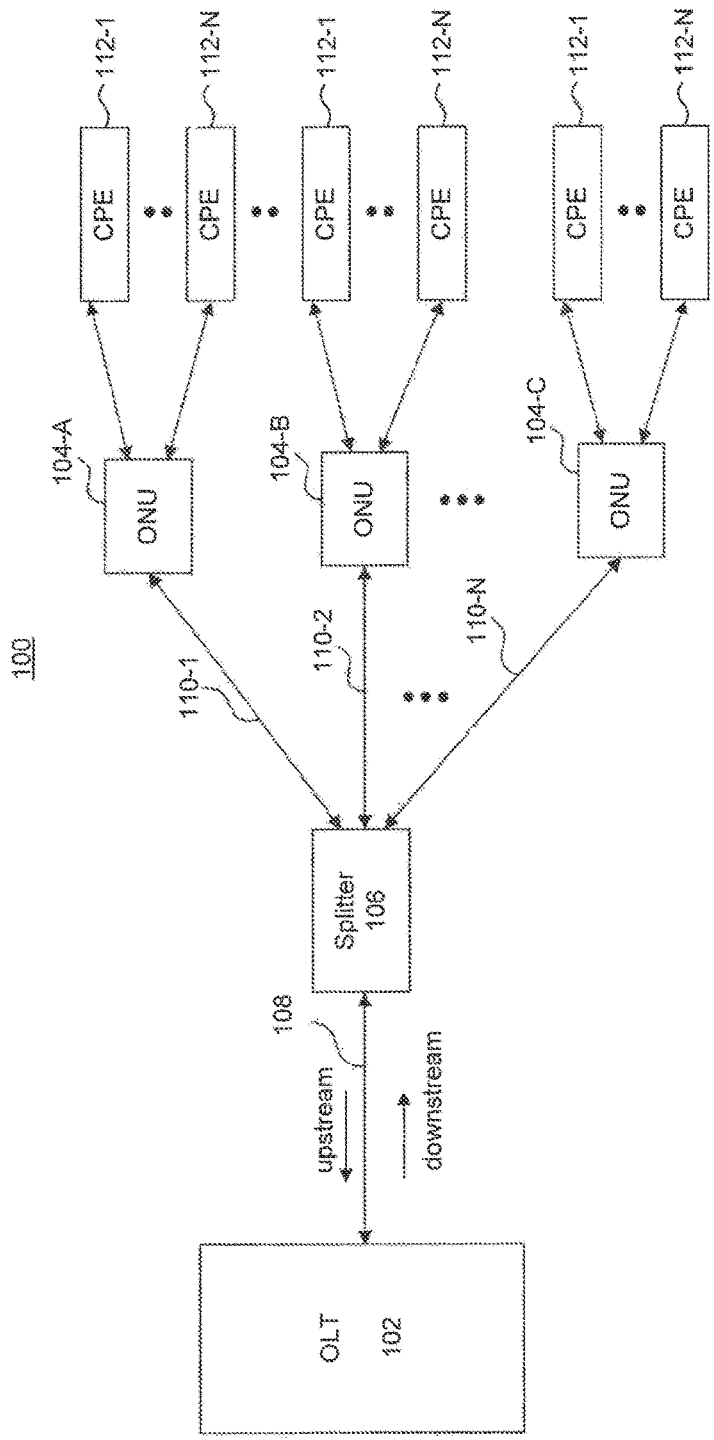
FIG. 1 illustrates an exemplary PON.

FIG. 1 illustrates an exemplary PON 100. PON 100 includes optical network units (ONUs) 104-1 to 104-N, which are communicatively coupled to optical line terminal (OLT) 102 via a passive optical splitter 106. Fiber 108 runs from OLT 102 to optical splitter 106. Optical splitter 106 is typically a passive device that does not require any power to operate. Optical splitter 106 divides the optical power into a plurality of optical paths 110-1 to 110-N. The optical paths 110 can vary, for example, from 2 to 128 or more. Each ONU 104 is coupled to one or more customer premises equipment (CPE) 112-1 to 112-N. Traffic data transmission is achieved by using two optical wavelengths, one for the downstream direction and another for the upstream direction. It is to be appreciated that N is an arbitrary number.

Downstream transmission of data from OLT 102 is broadcast to all ONUs 104. Encryption may be used to prevent eavesdropping. Each ONU 104 filters its respective data according to, for example, pre-assigned labels. ONUs 104 transmit respective data upstream to OLT 102 during different time slots allocated by OLT 102 for each ONU 104. For example, transmission of data upstream can be performed using a Time Division Multiple Access (TDMA) scheme. TDMA is a channel access method for shared networks. It allows several users to share the same frequency channel by dividing the signal into different time slots. Thus, ONUs 104 can transmit data in rapid succession each using its own time slot. This allows multiple ONUs 104 to share the same transmission medium (e.g. radio frequency channel) while using only a part of its channel capacity.

The Gigabit PON (GPON) standard is an example of a PON methodology currently being adopted by many telecommunication companies in order to deliver high-speed data services to their subscribers. These services typically include a bundle of TV broadcasting, Internet, and telephone services. To provide these services, an ONU 104 may be connected for example to a residential gateway (not illustrated) installed in a CPE 112. An input of the residential gateway is connected to the ONU 104. The gateways are coupled to, for example, a telephone device, a TV set-top box, or, a computer to provide Internet connectivity.

Although FIG. 1 illustrates a tree topology, a PON can also be based on other topologies, such as a logical ring or a logical bus. Note that, although in this disclosure many examples are based on GPONs, embodiments of the present disclosure are not limited to GPONs and can be applied to a variety of PONs, such as ATM-PONs (APONs), Broadband PONs (BPONs), Ethernet PONs (EPONs), and wavelength division multiplexing (WDM) PONs. It is to be appreciated that the speed of the PON network may be arbitrary and the embodiments presented herein are applicable regardless of the speed of the PON network. It is also to be appreciated that while the embodiments presented herein are described with respect to PON networks, they are equally applicable to any other type of network including but not limited to a Data Over Cable Service Interface Specification (DOCSIS) or a Digital subscriber line (DSL) network.

Figure 2A:
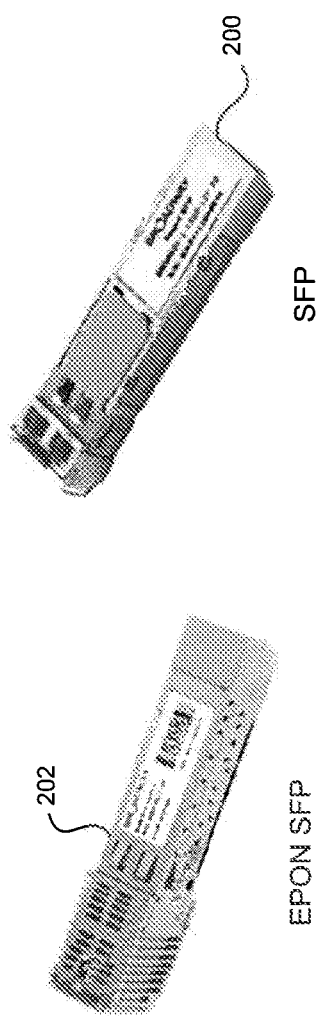
FIG. 2A illustrates a small form factor pluggable device (SFP) and an Ethernet Passive Optical Network (EPON) SFP.

FIG. 2A illustrates a small form factor pluggable device (SFP) 200 and an Ethernet Passive Optical Network (EPON) SFP 202. SFP 200 is a transceiver that can perform an ONU's system level functions in a housing that has a small form factor. SFP 200 may have built-in remote network monitoring and diagnostic capabilities. An example of an SFP is EPON SFP 202. EPON SFP 202 can perform all the functions of an ONU 104 including, but not limited to, optical electrical conversions, digital diagnosis, and system level functions. EPON SFP 202 also provides a software interface for system level communications. EPON SFP 202 may be in compliance with communication standards such as the Institute of Electrical and Electronics Engineers (IEEE) 802.3ah EPON standard.

Figure 2B:
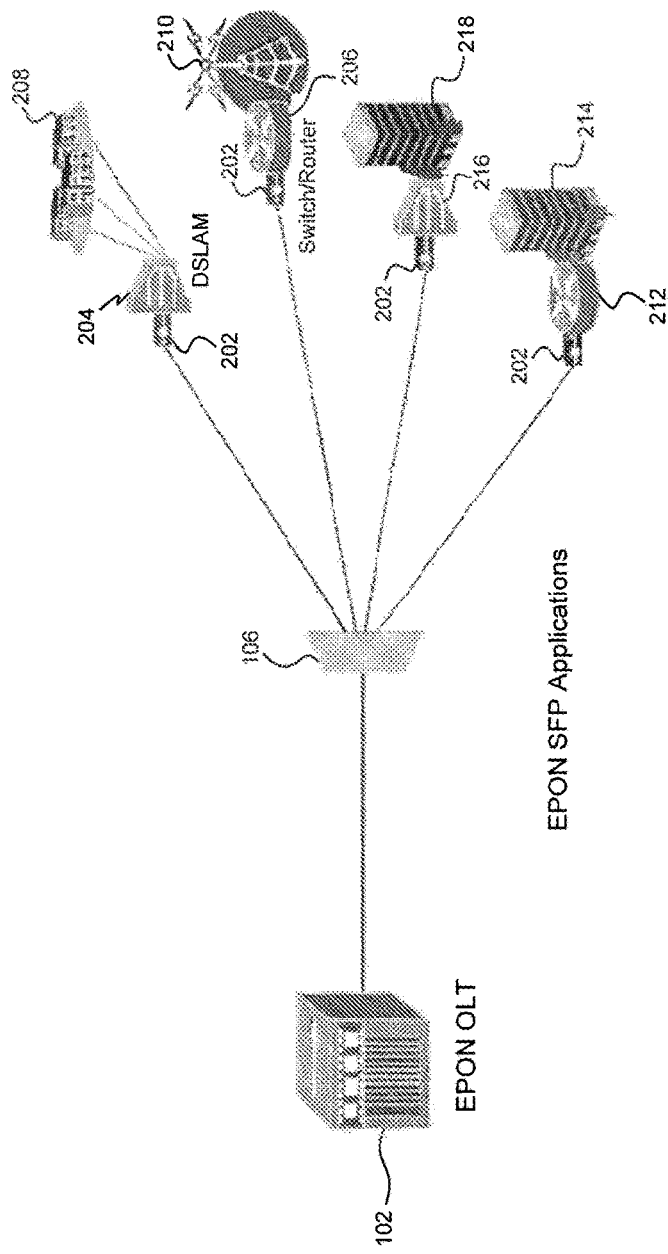
FIG. 2B illustrates an example of the plug-and-play functionality of SFPs.

FIG. 2B illustrates an example of the plug-and-play functionality of SFPs. FIG. 2B illustrates an OLT 102 coupled to EPON SFPs 206 via splitter 106.

In the example in FIG. 2B, a SFP such as EPON SFP 202 can be used to convert any customer premise equipment into an EPON compliant device. The advantage of an EPON SFP 202 is its compactness, low power consumption, and compatibility with many different standards. For example, EPON SFP 202 can be plugged into a Digital Subscriber Line Access Multiplexer (DSLAM) 204 to convert the DSLAM 204 into a device that can provide PON service to end users in a residential network 208. Similarly, EPON SFP 202 can be plugged into a switch/router 206 that is coupled to a wireless tower 210; to a switch/router 212 coupled to a business network 214; or to a cable modem 216 coupled to business/residential network 218.

EPON SFP 202 performs network access for customer premises equipment that it is coupled to by transparently performing network communications in the background. Equipment vendors can have instant EPON capability on existing CPE by attaching an SFP 200, such as EPON SFP 202, to the CPE. This allows service providers to utilize pre-existing equipment used for business services and wireless back haul networks in conjunction with EPON SFP 202 to provide EPON compatibility to all types of networks. The EPON SFP 202 also provides simplicity and cost effectiveness because of its small form factor. Thus, the EPON SFP 202 can be plugged into a switch, router, DSLAM, Ethernet over Copper (EOC), or any customer premises equipment to convert these devices into PON compliant devices. It is to be appreciated however that besides SFP 202 any other small or large form factor device may similarly be used to perform or provide PON compatibility.

Figure 3:
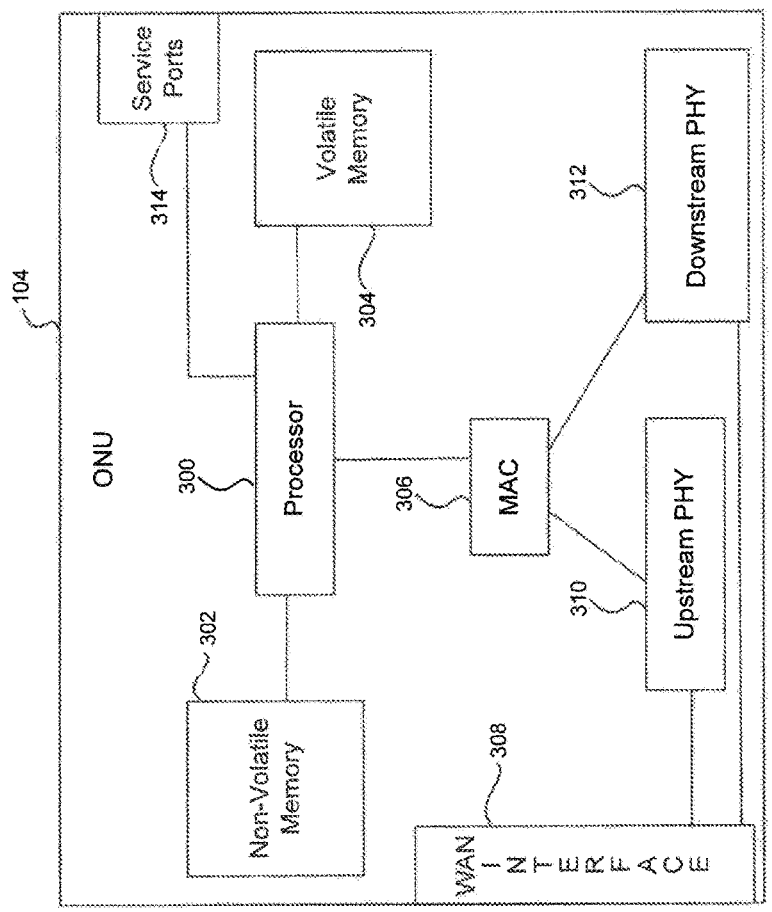
FIG. 3 illustrates an example ONU.

FIG. 3 illustrates an example ONU 104. ONU 104 includes a processor 300, non-volatile memory 302, volatile memory 304, a media access control layer (MAC) 306, an upstream physical layer (US PHY) 310, a downstream physical layer (DS PHY) 312, Wide Area Network (WAN) interface 308, and service ports 314. MAC 306, US PHY 310, and DS PHY 312 are typically implemented in the form of ASICs on a printed circuit board (PCB). Processor 300 may be coupled to non-volatile memory 302, service ports 314, volatile memory 304, and MAC 306. MAC 306 may be coupled to US PHY 310, DS PHY 312, and processor 300. WAN Interface 308 may be coupled to US PHY 310, and DS PHY 312. It is to be appreciated that the couplings illustrated in FIG. 3 are for example purposes and that alternate couplings between any of the components shown in FIG. 3 is within the scope of the embodiments presented herein.

WAN interface 308 may provide an interface to any type of network including, but not limited to, a PON such as an EPON. Service ports 314 may be any type of communication port including, but not limited to, phone jacks, WiFi ports, local area network (LAN) ports, and voice access ports.

US PHY 310 forms the physical layer interface between ONU 104 and the upstream channels of PON 100. ONU 104 may include a separate US PHY 310 for each one of its upstream channels. Video, voice, data and/or control messages that are destined for OLT 102 are collected at US PHY 310 and transmitted to OLT 102. US PHY 310 modulates and/or formats the information for upstream transmission to OLT 102.

DS PHY 312 forms the physical layer interface between ONU 104 and the downstream channel(s) of PON 100. DS PHY 312 receives and demodulates a downstream data signal from OLT 102.

The wavelength spectrum available for use by the system 100 for communication may be partitioned into "channels." As used herein, the term "downstream channels" refers to the channels over which data is transferred from the OLT 102 to ONUs 104. The term "upstream channels" refers to the channels over which data is transferred from ONUs 104 to the OLT 102.

MAC 306 receives downstream signals from DS PHY 312 and provides upstream signals to US PHY 310. MAC 136 operates as the lower sublayer of the data link layer for an ONU 104. In some embodiments, MAC 306 supports fragmentation, concatenation, payload header suppression/expansion, and/or error checking for signals transported over the physical layer.

Volatile memory 304, also known as volatile storage, is memory that requires power to retain stored information. Volatile memory 304 retains the stored information as long as power is supplied to it. When the power supply is turned off or interrupted, the information stored on it is lost. Examples of volatile memory 304 include, but are not limited to, Random Access Memory (RAM), Dynamic RAM (DRAM), Static RAM (SRAM), and Double data rate synchronous dynamic random-access memory (DDR SDRAM). In contrast, non-volatile memory 302 (also commonly referred to as "flash" memory) is memory that can retain stored information even when not powered. Examples of non-volatile memory include, but are not limited to, flash memory, hard disk drive, read only memory (ROM), ferroelectric RAM (F-RAM), and Electrically Erasable Programmable Read-Only Memory (EEPROM).

A typical ONU 104 includes non-volatile memory 302 to store software for booting, discovery, ranging, and activating the ONU. After an ONU has booted, software stored in non-volatile memory 302 is copied into volatile memory 304 from where processor 300 executes the software for discovery, ranging, and activation of the ONU.

Occasionally an OLT 102 may perform software upgrades during which the ONU 104 replaces the software in non-volatile memory 302 by downloading software from OLT 102. There are various types of ONUs 104 ranging from simple media converters and bridges to residential or business gateways and wireless access points. Each of these ONUs 104 may require a different type of software. Some ONUs 104 provide services even when disconnected from a PON. For example, a residential gateway may support connectivity between LAN ports. This connectivity between LAN ports can support, for example, a multi-player video game network in a residence without requiring access to the PON. For this purpose, sometimes non-volatile memory 302 is necessary to store the software even when the ONU is offline and not connected to a PON.

On the other hand, some ONUs 104 provide no service if they are "offline" i.e. they are not connected to the OLT 102 in a PON network. For such ONUs, the inventors have recognized that there is no incentive to store software in non-volatile memory 302 when the ONU 104 is offline. The inventors have recognized many other advantages for eliminating non-volatile memory 302 in ONUs 104. One reason is to reduce the manufacturing cost of an ONU 104. The cost reduction results from both the elimination of the non-volatile memory 302 and the reduced size of a printed circuit board or a System on Chip (SoC) that houses non-volatile memory 302. Another reason is some ONUs 104 have a very small form factor, e.g. EPON SFP 202, and reducing the number of components is greatly beneficial in the design of such ONUs. For example, due to the very small form factor of EPON SFP 202 any reduction in parts reduces the size and overall cost of the EPON SFP 202. Yet another reason is the benefit in reduction of the power consumed by the ONU. Eliminating the non-volatile memory 302 from ONU 104 reduces power consumption directly by eliminating an active component and indirectly by reducing the area or footprint of the ONU which also improves heat dissipation.

In addition, the prevalent method for ONU 104 software upgrade is time and resource intensive when performed over a large PON network. In embodiments presented herein, the broadcast feature of PON networks is utilized to expedite the software upgrade of ONUs. For example, in one embodiment, OLT 102 periodically broadcasts software for ONUs on a downstream channel that is reserved for software upgrades. Software size for ONUs is typically in the order of a few megabytes, so broadcasting the software every few seconds consumes a negligible portion of the multi-gigabit bandwidth of PON networks. In other examples, there may be no periodic broadcast of software by OLT 102 and ONU 104 may request the software from the OLT 102 on the reserved downstream channel after a partial boot and synchronization with the OLT 102.

The inventors have also recognized secure boot as a further advantage to broadcasting software from the OLT instead of storing it on non-volatile memory 302. In conventional ONU's the software stored in non-volatile memory 302 can be tampered with. Hackers can remove non-volatile memory 302 and program it to provide functionality that an ONU has not been authorized for. For example, the software in non-volatile memory 302 can be modified or replaced to allow high speed or multi-media access that the ONU user may not have subscribed for. By broadcasting the software, tampering can be avoided because the software will be stored in volatile memory 304 that automatically deletes the stored software if the ONU 104 is powered off, if the volatile memory is removed, or if power is interrupted to the volatile memory 304.

Accordingly, embodiments presented herein provide for an ONU without non-volatile memory 302. In a first example, ONU 104 stores instructions for a partial boot. Upon startup, the ONU 104 partially boots up based upon the instructions. The partial boot may also allow debugging of the ONU 104 in the event of malfunctions during startup and synchronization. After the partial boot, MAC 306 synchronizes with a downstream signal transmitted by the OLT 102. Alternatively, ONU 104 may be hardwired to partially boot and/or synchronize with the downstream signal. Synchronization with the OLT 102 by the ONU 104 includes delineation of the downstream frames and channels, so that software can be downloaded, without a need to range and activate the ONU 104, and without the need to communicate with the OLT 102. In a typical PON, the ONU 104 has to first be discovered, ranged, and activated, and only then can it download new software from the OLT 102. In the present embodiment, synchronization on the downstream signal enables the ONU 104 to delineate frames and channels so that software can be downloaded without a need to discover, range, and activate the ONU 104, and without the need for 2-way communication with the OLT 102. This is an advantage over typical systems requiring full discovery, ranging and activation, which involves one or more of establishment of a management channel, exchange of operation, administration, and maintenance (OAM) messages, and Management Information Base (MIB) synchronization before download of software can take place. OLT 102 may be transmitting different software for different types of ONUs 104 and/or different software versions for a particular type of ONU. After synchronizing with the downstream signal of the OLT 102, the ONU 104 may determine a type and/or version of the ONU 104 and download the corresponding software broadcast on a downstream channel of the OLT 102 that is reserved for software transmission. The reserved downstream channel may be an Optical Network Terminal (ONT) Management Control Interface (OMCI). The reserved downstream channel can also be a TR-69 compliant channel. TR-69 defines an application layer protocol for remote management of end-user devices. In another example, the reserved downstream channel may be a channel that uses an Open Systems Interconnection (OSI) layer 3 or layer 4 compatible protocol such as the Trivial File Transfer Protocol (TFTP). The reserved downstream channel may be identified by a predetermined identification that is associated with the downstream channel. In an example, the predetermined identification may be one of a Logical Link Identifier (LLID), a predetermined embedded Operation, Administration, and Maintenance (OAM) message field, an embedded channel identifier in a downstream frame structure, an Ethernet MAC address or Gigabit Passive Optical Network (GPON) Encapsulation Method (GEM) port identification. It is to be appreciated that the type of predetermined identification may be an arbitrary design choice.

After ONU 104 has partially booted and MAC 306 has synchronized with the downstream signal, the MAC 306 downloads the full software required for a complete boot and activation of the ONU 104. The downloaded software is stored in volatile memory 304. Processor 300 reboots the ONU based on the software stored in volatile memory 304. After the reboot, processor 300 runs the software that allows the OLT 102 to discover, range and activate the ONU 104 based on the software stored in volatile memory 304. Activation of the ONU 104 allows the ONU to perform ONU functions including, but not limited to, one or more of routing, data transmissions, voice calls, configuration of an Ethernet interface rate, packet filtering and anti-illegal message attack protection to suppress unknown unicast, broadcast, and multicast messages; support performance statistics function of Ethernet ports; support Dynamic Host Configuration Protocol (DHCP); support the option of reporting the physical position information of Ethernet interfaces; support Point-to-Point Protocol over Ethernet (PPPoE) function for accurate subscribers identification; support multiple voice protocols such as H.248, Media Gateway Control Protocol (MGCP), and Session Initiation Protocol (SIP); support Internet Group Management Protocol (IGMP) Snooping and IGMP Proxy; support Spanning Tree Protocol (STP)/Rapid Spanning Tree Protocol (RSTP); support OSI Layer 2/3 wire-speed forwarding; support a triple churning algorithm for data encryption; support Quality of Service (QoS) functions; support global configuration of queue priority and flexible mapping of IEEE 802.1p value of messages; support traffic scheduling modes; and configure the weight of scheduling queues to ensure QoS of key services such as Voice over Internet Protocol (VoIP) and Internet Protocol television (IPTV) under multiple service conditions.

In a second example, the MAC 306 only synchronizes with the downstream signal of the OLT 102 and does not partially boot ONU 104. After synchronization, the MAC 306 only downloads software broadcast by the OLT 102 on the reserved downstream channel that is sufficient to partially boot the ONU 104. After the partial boot, the MAC 306 determines a type and/or version of the ONU 104 and downloads the rest of the software on the reserved downstream channel of the OLT 102. The ONU 104 may request the full software from the OLT 102 or the OLT 102 may periodically broadcast the full software. After downloading the full software needed for discover, ranging, and activation, the processor 300 reboots ONU 104 based on the software stored in volatile memory 304. After rebooting, the processor 300 discovers, ranges, and activates the ONU 104 based on the software stored in volatile memory 304.

In one example, where the ONUs in a PON may use different software due to different manufacturers of the ONUs, or where the ONUs support different capabilities, the OLT may only transmit software on the reserved downstream channel that allows for a partial boot of the ONUs. The ONU's can synchronize with the OLT after a partial boot and download their corresponding software from the OLT. In another example where all ONUs 104 in the PON are of the same type, the OLT 102 may broadcast only one version of software on the reserved downstream channel. In a further example, the OLT 102 may periodically transmit both the entire ONU software or only software that allows for a partial boot of an ONU. In an example, the software received on the reserved downstream channel is encrypted by a public key. The ONU 104 uses a private key to decrypt and install the software.

Figure 4:
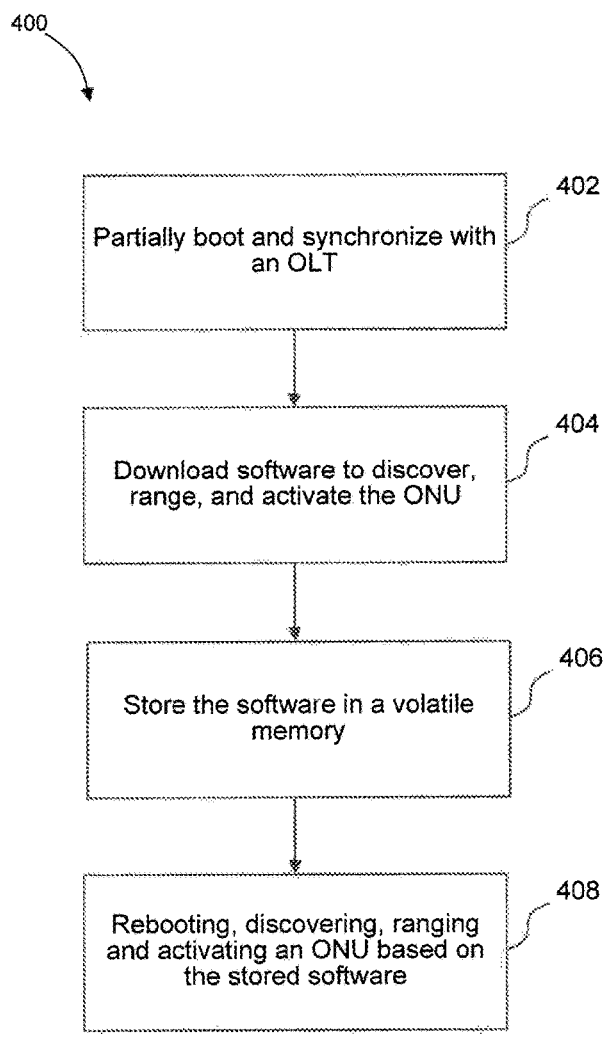
FIG. 4 illustrates an example flowchart for downloading the entire software for an ONU according to an embodiment of the disclosure.

FIG. 4 illustrates an example flowchart 400 for downloading the entire software for an ONU according to an embodiment of the disclosure. Flowchart 400 will be described with continued reference to the example operating environment depicted in FIGS. 1-3. However, the process is not limited to these embodiments. Note that some steps shown in flowchart 400 do not necessarily have to occur in the order shown. In an example, the steps are performed by ONU 104.

In step 402, the ONU partially boots and synchronizes with a downstream signal of the OLT based on instructions stored in a MAC 306. For example, MAC 306 partially boots the ONU 104 and synchronizes with a downstream signal transmitted by OLT 102.

In step 404, the ONU 104 downloads the entire software needed to discover, range, and activate the ONU 104 from a reserved downstream channel of the OLT 102.

In step 406, the ONU 104 stores the downloaded software in volatile memory 304.

In step 408, the ONU reboots, discovers, ranges, and activates the ONU based on the software stored in volatile memory 304.

Figure 5:
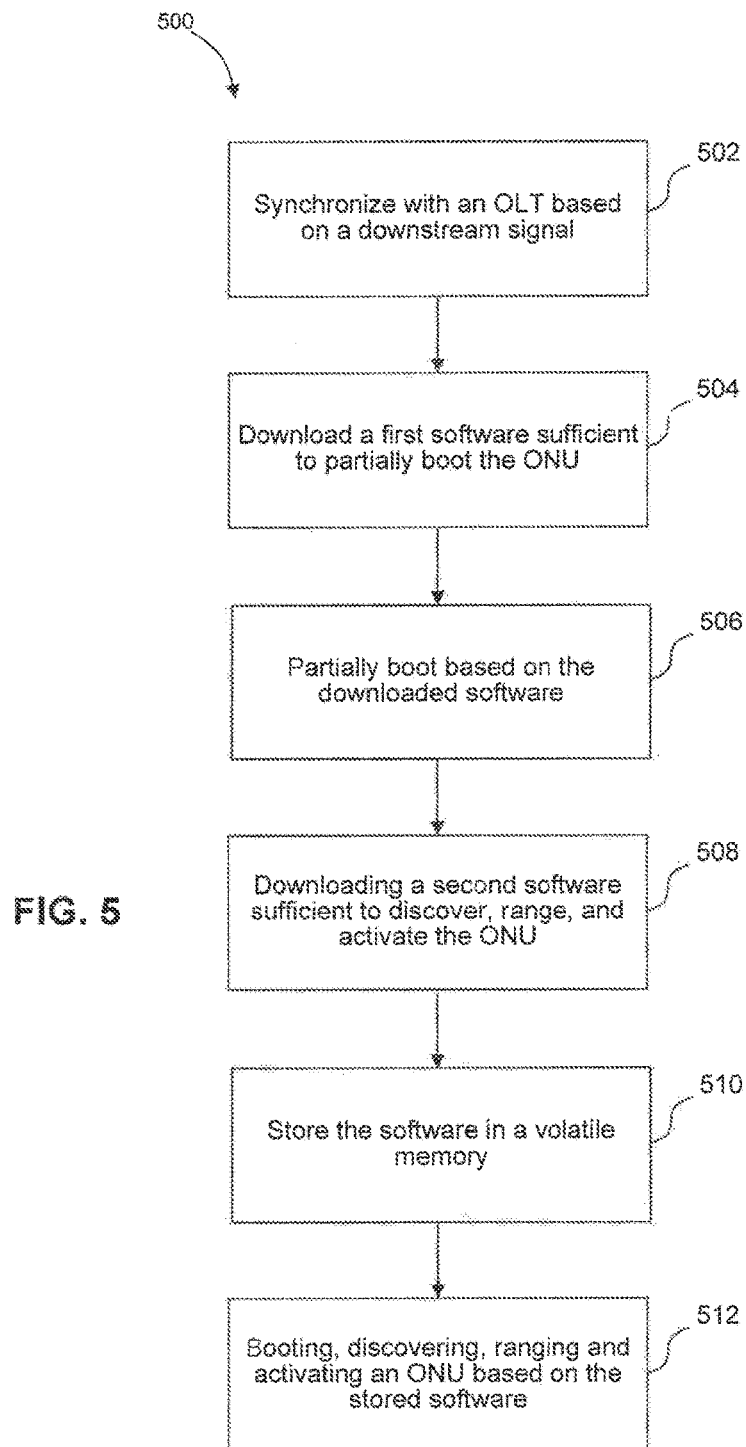
FIG. 5 illustrates an example flowchart for partial download of software followed by download of the entire software for an ONU according to an embodiment of the disclosure.

FIG. 5 illustrates an example flowchart 500 for partial download of software followed by download of the entire software for an ONU according to an embodiment of the disclosure. Flowchart 500 will be described with continued reference to the example operating environment depicted in FIGS. 1-3. However, the process is not limited to these embodiments. Note that some steps shown in flowchart 500 do not necessarily have to occur in the order shown. In an example, the steps of flowchart 500 are performed by ONU 104.

In step 502, the MAC 306 synchronizes with the OLT 102 based on a downstream signal transmitted by the OLT 102.

In step 504, the MAC 306 downloads software sufficient to partially boot the ONU from the reserved downstream channel of OLT 102.

In step 506, the ONU 104 partially boots based on the downloaded software.

In step 508, the ONU 104 downloads the entire software needed to discover, range and activate the ONU 104 from a reserved downstream channel of the OLT 102.

In step 510, the ONU 104 stores the downloaded software in volatile memory 304.

In step 512, the ONU reboots, discovers, ranges, and activates the ONU based on the software stored in volatile memory 304.

Figure 6:
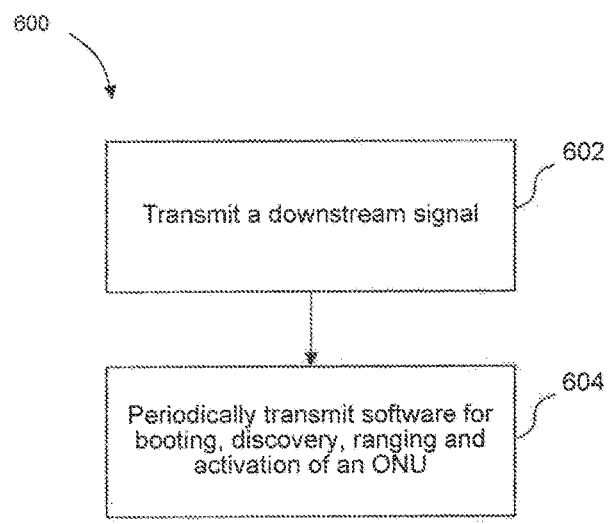
FIG. 6 illustrates an example flowchart for steps performed by an OLT for periodic full software transmission to ONUs according to an embodiment of the disclosure.

FIG. 6 illustrates an example flowchart 600 for steps performed by an OLT 102 for periodic full software transmission to ONUs 104 according to an embodiment of the disclosure. Flowchart 600 will be described with continued reference to the example operating environment depicted in FIGS. 1-3. However, the process is not limited to these embodiments. Note that some steps shown in flowchart 600 do not necessarily have to occur in the order shown. In an example, the steps of flowchart 600 are performed by OLT 102.

In step 602, the OLT 102 transmits a downstream signal. The downstream signal is used by an ONU 104 to synchronize with the OLT 102.

In step 604, the OLT periodically transmits software for ONUs 104 for booting, discovery, ranging, and activation.

Figure 7:
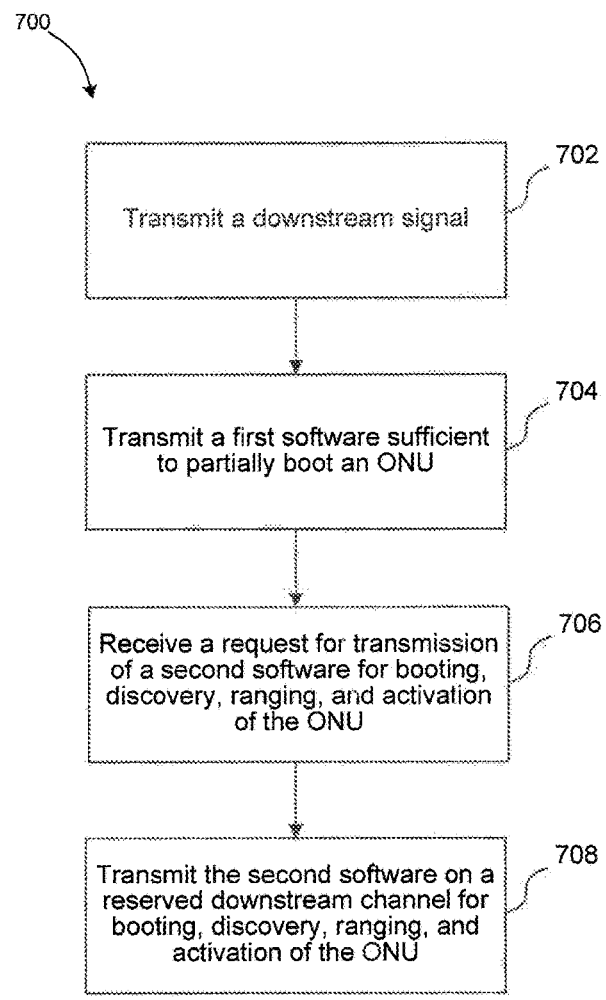
FIG. 7 illustrates an example flowchart of steps performed by an OLT for transmission of a first software for a partial boot and transmission of a second software for a full boot according to an embodiment of the disclosure.

FIG. 7 illustrates an example flowchart 700 of steps performed by an OLT 102 for transmission of a first software for a partial boot and transmission of a second software for a full boot according to an embodiment of the disclosure. Flowchart 700 will be described with continued reference to the example operating environment depicted in FIGS. 1-3. However, the process is not limited to these embodiments. Note that some steps shown in flowchart 700 do not necessarily have to occur in the order shown. In an example, the steps of flowchart 700 are performed by OLT 102.

In step 702, the OLT 102 transmits a downstream signal. The downstream signal is used by an ONU 104 to synchronize with the OLT 102.

In step 704, the OLT 102 transmits a first software that allows the ONU to partially boot.

In step 706, the OLT 102 receives a request from the ONU 104 for transmission of a second software for booting, discovery, ranging, and activation of the ONU 104.

In step 708, the OLT 102 transmits the second software on the reserved downstream channel for booting, discovery, ranging, and activation of the ONU 104.

Example General Purpose Computer System

Embodiments presented herein, or portions thereof, can be implemented in hardware, firmware, software, and/or combinations thereof.

The embodiments presented herein apply to any communication system between two or more devices or within subcomponents of one device. The representative functions described herein can be implemented in hardware, software, or some combination thereof. For instance, the representative functions can be implemented using computer processors, computer logic, application specific circuits (ASIC), digital signal processors, etc., as will be understood by those skilled in the arts based on the discussion given herein. Accordingly, any processor that performs the functions described herein is within the scope and spirit of the embodiments presented herein.

Figure 8:
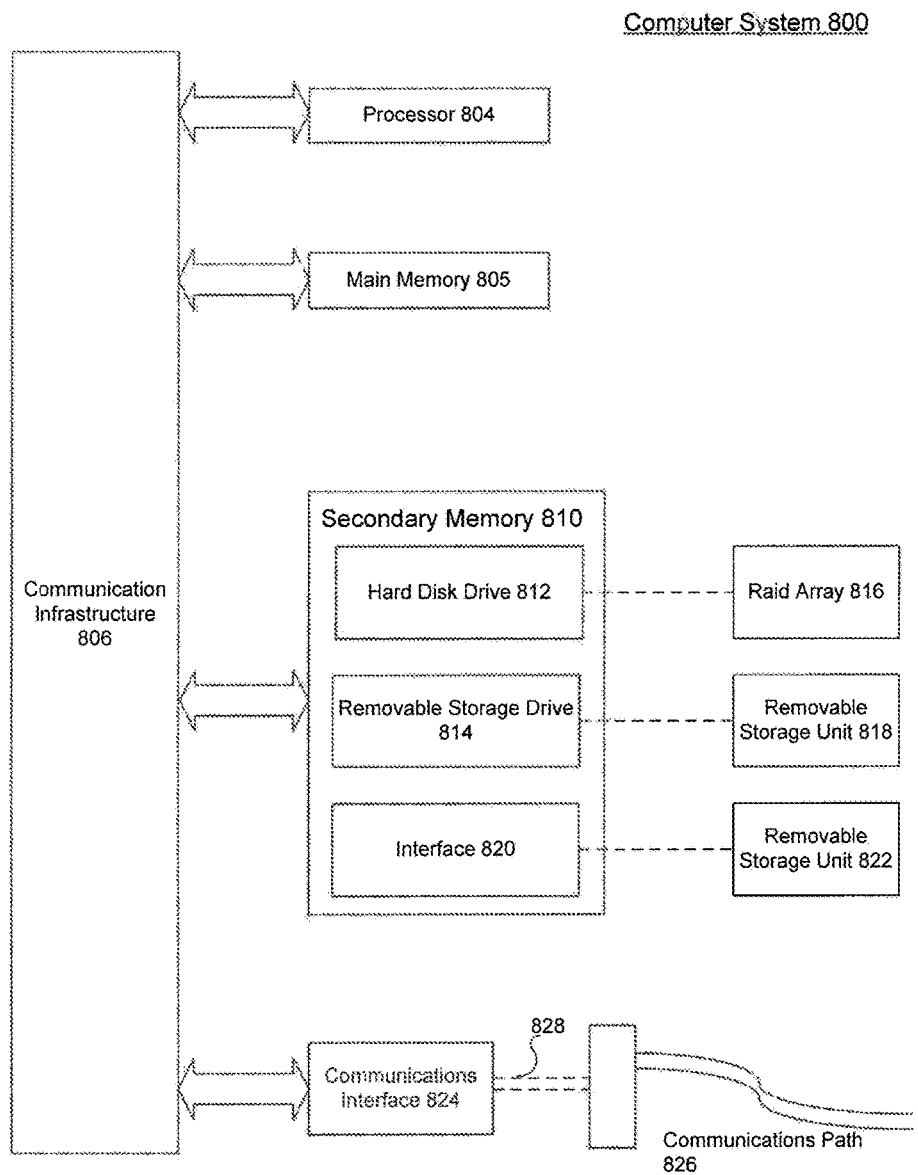
FIG. 8 is a block diagram of an exemplary computer system on which the embodiments of the present disclosure can be implemented.

The following describes a general purpose computer system that can be used to implement embodiments of the disclosure presented herein. The present disclosure can be implemented in hardware, or as a combination of software and hardware. Consequently, the disclosure may be implemented in the environment of a computer system or other processing system. An example of such a computer system 800 is shown in FIG. 8. For example, one or more of the flowcharts and algorithms described herein can be implemented utilizing all or parts of computer system 800. The computer system 800 includes one or more processors, such as processor 804. Processor 804 can be a special purpose or a general purpose digital signal processor. The processor 804 is connected to a communication infrastructure 806 (for example, a bus or network). Various software implementations are described in terms of this exemplary computer system. After reading this description, it will become apparent to a person skilled in the relevant art how to implement the disclosure using other computer systems and/or computer architectures.

Computer system 800 also includes a main memory 805, preferably random access memory (RAM), and may also include a secondary memory 810. The secondary memory 810 may include, for example, a hard disk drive 812, and/or a RAID array 816, and/or a removable storage drive 814, representing a floppy disk drive, a magnetic tape drive, an optical disk drive, etc. The removable storage drive 814 reads from and/or writes to a removable storage unit 818 in a well-known manner. Removable storage unit 818, represents a floppy disk, magnetic tape, optical disk, etc. As will be appreciated, the removable storage unit 818 includes a computer usable storage medium having stored therein computer software and/or data.

In alternative implementations, secondary memory 810 may include other similar means for allowing computer programs or other instructions to be loaded into computer system 800. Such means may include, for example, a removable storage unit 822 and an interface 820. Examples of such means may include a program cartridge and cartridge interface (such as that found in video game devices), a removable memory chip (such as an EPROM, or PROM) and associated socket, and other removable storage units 822 and interfaces 820 which allow software and data to be transferred from the removable storage unit 822 to computer system 800.

Computer system 800 may also include a communications interface 824. Communications interface 824 allows software and data to be transferred between computer system 800 and external devices. Examples of communications interface 824 may include a modem, a network interface (such as an Ethernet card), a communications port, a PCM-CIA slot and card, etc. Software and data transferred via communications interface 824 are in the form of signals 828 which may be electronic, electromagnetic, optical or other signals capable of being received by communications interface 824. These signals 828 are provided to communications interface 824 via a communications path 826. Communications path 826 carries signals 828 and may be implemented using wire or cable, fiber optics, a phone line, a cellular phone link, an RF link and other communications channels.

The terms "computer program medium" and "computer usable medium" are used herein to generally refer to media such as removable storage drive 814, a hard disk installed in hard disk drive 812, and signals 828. These computer program products are means for providing software to computer system 800.

Computer programs (also called computer control logic) are stored in main memory 805 and/or secondary memory 810. Computer programs may also be received via communications interface 824. Such computer programs, when executed, enable the computer system 800 to implement the present disclosure as discussed herein. In particular, the computer programs, when executed, enable the processor 804 to implement the processes of the present disclosure. For example, when executed, the computer programs enable processor 804 to implement part of or all of the steps described above with reference to the flowcharts herein. Where the disclosure is implemented using software, the software may be stored in a computer program product and loaded into computer system 800 using raid array 816, removable storage drive 814, hard drive 812 or communications interface 824.

In other embodiments, features of the disclosure are implemented primarily in hardware using, for example, hardware components such as Application Specific Integrated Circuits (ASICs) and programmable or static gate arrays. Implementation of a hardware state machine so as to perform the functions described herein will also be apparent to persons skilled in the relevant art(s).

CONCLUSION

While various embodiments have been described above, it should be understood that they have been presented by way of example, and not limitation. It will be apparent to persons skilled in the relevant art that various changes in form and detail can be made therein without departing from the spirit and scope of the embodiments presented herein.

The embodiments presented herein have been described above with the aid of functional building blocks and method steps illustrating the performance of specified functions and relationships thereof. The boundaries of these functional building blocks and method steps have been arbitrarily defined herein for the convenience of the description. Alternate boundaries can be defined so long as the specified functions and relationships thereof are appropriately performed. Any such alternate boundaries are thus within the scope and spirit of the claimed embodiments. One skilled in the art will recognize that these functional building blocks can be implemented by discrete components, application specific integrated circuits, processors executing appropriate software and the like or any combination thereof. Thus, the breadth and scope of the present embodiments should not be limited by any of the above-described exemplary embodiments. Further, the invention should be defined only in accordance with the following claims and their equivalents.

It is to be appreciated that the Detailed Description section, and not the Abstract section, is intended to be used to interpret the claims. The Abstract section may set forth one or more but not all exemplary embodiments of the present disclosure as contemplated by the inventor(s), and thus, are not intended to limit the present invention and the appended claims in any way.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present disclosure. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present disclosure should not be limited by any of the above-described exemplary embodiments, but should be defined only in accordance with the following claims and their equivalents.

The claims in the instant application are different than those of any parent application, child application, or other related applications. The Applicant therefore rescinds any disclaimer of claim scope made in any parent application, child application, or any predecessor application in relation to the instant application. The Examiner is therefore advised that any such previous disclaimer and the cited references that it was made to avoid, may need to be revisited. Further, the Examiner is also reminded that any disclaimer made in the instant application should not be read into or against the parent application, child application, or related application.

What is claimed is:

1. A device in a network, comprising:
   a media access control (MAC) configured to synchronize to a second device based on a downstream signal transmitted by the second device,
   wherein the device is configured to receive a software from the second device,
   wherein the device does not pre-store the software in a non-volatile memory, and
   wherein the device is configured to store instructions for a partial boot of the device;
   a volatile memory configured to store the received software; and
   a processor configured to fully boot, discover, range, and activate the device based on the received software stored in the volatile memory.

2. A device in a network, comprising:
   a media access control (MAC) configured to:
      synchronize to a second device based on a downstream signal transmitted by the second device,
      determine a type of the device, and
      download a software from a reserved downstream channel of the second device based on the type of the device,
      wherein the device is configured to receive the software from the second device,
      wherein the device does not pre-store the software in a non-volatile memory, and
      wherein the device is configured to store instructions for a partial boot of the device; and
   a volatile memory configured to store the received software.

3. The device of claim 1, wherein the device is further configured to execute the stored instructions to partially boot the device to enable debugging of the device and synchronizing with the downstream signal, the synchronizing with the downstream signal including delineation of downstream frames and channels which allows the software to be downloaded from a reserved downstream channel of the second device without fully discovering, ranging, and activating the device and without two-way communication with the second device.

4. The device of claim 1, wherein the software is periodically received via a reserved downstream channel that is configured to be identified by a predetermined identification, and
   wherein the predetermined identification is one of: a predetermined embedded Operation, Administration, and Maintenance (OAM) message field, an embedded channel identifier in a downstream frame structure, a Logical Link Identifier (LLID), an Ethernet MAC address or Gigabit Passive Optical Network (GPON) Encapsulation Method (GEM) port identification.

5. The device of claim 1, wherein the received software is encrypted by a public key, and
wherein the device is further configured to use a private key to decrypt the software.

6. The device of claim 1, wherein the software is periodically received via a reserved downstream channel, and wherein the reserved downstream channel is one of: an Optical Network Terminal (ONT) Management Control Interface (OMCI), a Technical Report (TR)-69 compliant channel, an Open Systems Interconnection (OSI) layer 3 or layer 4 compliant channel, or a Trivial File Transfer Protocol (TFTP) compliant channel.

7. A method to operate a device in a network, comprising:
storing instructions for a partial boot of the device;
synchronizing with a second device based on a downstream signal transmitted by the device;
receiving a software from the second device, wherein the device does not pre-store the software in a non-volatile memory;
storing the received software in a volatile memory; and
fully booting, discovering, ranging, and activating the device based on the received software stored in the volatile memory.

8. A method to operate a device in a network, comprising:
storing instructions for a partial boot of the device;
synchronizing with a second device based on a downstream signal transmitted by the device:
determining a type of the device;
receiving a software from the second device, wherein the receiving comprises downloading the software from a reserved downstream channel of the second device based on the type of the device, and wherein the device does not pre-store the software in a non-volatile memory; and
storing the received software in a volatile memory.

9. The method of claim 7, further comprising:
debugging the device and synchronizing with the downstream signal based on the partial boot, the synchronizing with the downstream signal including delineation of downstream frames and channels which allows the software to be downloaded from the reserved downstream channel without fully discovering, ranging, and activating the device and without two-way communication with the second device.

10. The method of claim 8, further comprising:
executing the stored instructions to partially boot the device; and
debugging and synchronizing with the downstream signal based on the partial boot, the synchronizing with the downstream signal including delineation of downstream frames and channels which allows the software to be downloaded from the reserved downstream channel without fully discovering, ranging, and activating the device and without two-way communication with the second device.

11. The method of claim 8, wherein the receiving comprises:

identifying the reserved downstream channel by a predetermined identification,
wherein the predetermined identification is one of: a predetermined embedded Operation, Administration, and Maintenance (OAM) message field, an embedded channel identifier in a downstream frame structure, a Logical Link Identifier (LLID), an Ethernet MAC address, or a Gigabit Passive Optical Network (GPON) Encapsulation Method (GEM) port identification.

12. The method of claim 7, further comprising:
decrypting the received software using a private key, wherein the received software is encrypted by a public key.

13. The method of claim 8, wherein the reserved downstream channel is one of: an Optical Network Terminal (ONT) Management Control Interface (OMCI), a Technical Report (TR)-69 compliant channel, an Open Systems Interconnection (OSI) layer 3 or layer 4compliant channel, or a Trivial File Transfer Protocol (TFTP) compliant channel.

14. A non-transitory computer readable medium having stored thereon computer executable instructions that, if executed by a device in a network, cause the device to perform operations, the operations comprising:
storing instructions for a partial boot of the device;
synchronizing with a second device based on a downstream signal transmitted by the second device;
receiving a software from the second device, that is periodically broadcasted by the second device on a reserved downstream channel, wherein the device does not pre-store the software in a non-volatile memory;
storing the received software in a volatile memory; and
fully booting, discovering, ranging, and activating the device based on the received software stored in the volatile memory.

15. The non-transitory computer readable medium of claim 14, wherein the operations further comprise:
determining a type of the device; and
wherein the receiving comprises:
downloading the software from the reserved downstream channel of the second device based on the type of the device.

16. The non-transitory computer readable medium of claim 14, wherein the operations further comprise:
identifying the reserved downstream channel by a predetermined identification, and
wherein the predetermined identification is one of: a predetermined embedded Operation, Administration, and Maintenance (OAM) message field, an embedded channel identifier in a downstream frame structure, a Logical Link Identifier (LLID), an Ethernet MAC address, or a Gigabit Passive Optical Network (GPON) Encapsulation Method (GEM) port identification.

17. The non-transitory computer readable medium of claim 14, wherein the operations further comprise:
decrypting the software using a private key, wherein the received software is encrypted by a public key.

* * * * *

UNITED STATES PATENT AND TRADEMARK OFFICE
CERTIFICATE OF CORRECTION

PATENT NO. : 10,333,911 B2
APPLICATION NO. : 15/277212
DATED : June 25, 2019
INVENTOR(S) : Elmoalem et al.

Page 1 of 1

It is certified that error appears in the above-identified patent and that said Letters Patent is hereby corrected as shown below:

In the Claims

In Column 14, Line 19, please replace "layer 4compliant channel" with --layer 4 compliant channel--.

Signed and Sealed this
Third Day of September, 2019

Andrei Iancu
*Director of the United States Patent and Trademark Office*